Patented Sept. 21, 1943

2,329,861

UNITED STATES PATENT OFFICE 2,329,861

PARASITICIDAL PREPARATION

William P. ter Horst, Packanack Lake, N. J., assignor to United States Rubber Company, New York, N. Y., a corporation of New Jersey No Drawing. Application August 3, 1940, Serial No. 351,269

4 Claims. (Cl. 167—24)

This invention relates to new compositions of matter which are useful as parasiticidal preparations, and to methods of preparing the same.

It has been found that rubber oils, i. e. distillates produced by the destructive distillation of rubber, raw or reclaim, or other forms of rubber including isomerized rubber, and vulcanized rubber, particularly waste rubber such as bead wire scrap, are excellent solvents for natural organic parasiticides or toxicants of plant origin. The use of the rubber oils herein obviates the necessity of extraction of such toxicants with solvents such as chloroform or ethylene dichloride, which are injurious to plant life and therefore have to be removed before use. By use of the rubber oils a medium is also provided which per se has insecticidal and fungicidal properties.

The rubber distillates are excellent solvents for toxicants of the type occurring in plants containing rotenone and similar resins, such as Derris, cube, timbo, devil's shoe string, and the like, as well as for the toxicants contained in pyrethrum flowers, and for nicotine and nicotine compounds, which are toxicants obtained from tobacco, and nicotine sulfate. The rubber distillates may be used in refined or unrefined condition and generally are composite liquids having a boiling range up to about 300° C. and higher. They may be prepared in various manners including those set forth in U. S. Patents 2,039,112 and 2,126,277.

The rubber oil may be used to extract the toxicant from the original plant or root, or may be used to dissolve pre-extracted, that is, pre-manufactured toxicants. This is illustrated in the following examples in which the parts are by weight:

A. Extraction of Derris root and rubber distillate

Derris root is cut up, ground and extracted in the cold or at elevated temperature with the rubber distillate. The resulting solution of the toxicants in Derris root in rubber distillate is removed from the fibrous contents by filitration or otherwise. This solution forms the base of the insecticide preparation. If necessary, the extraction may be repeated with fresh rubber distillate until all the toxicants have been removed from the Derris root.

B. Premanufactured Derris extract (or other extracts, such as cube, timbo, pyrethrum, tobacco extract)

Premanufactured Derris extract is dissolved in rubber distillate. The following recipe has given good results.

20 parts of Derris resinate containing 35% rotenone are dissolved in 80 parts of rubber distillate. Dissolve the Derris resinate by heating (about 80° C.) and stirring. Cool to 50–60° C. and stir in 5 parts Emulphor El. Maintain at 50–60° C. while 140 parts of water, which has been heated to 50–60° C. is added to it with high speed stirring. Pass through a homogenizer or colloid mill if desired.

The tabulation below gives results of tests on an emulsion of the rubber distillate itself and on an emulsion of the rubber distillate having Derris resinate dissolved therein according to the above-mentioned recipe, and shows the high efficacy of the latter compounds.

The rubber distillate from bead wire scrap was put into an emulsifiable condition as follows:

25 parts of rubber distillate were dissolved in 12.5 parts dioxan, 5.0 parts Emulphor-EL (a commercial emulsifying agent), and 57.5 parts corn oil.

This base formula was applied at a dilution in water of 1:800.

The base formula comprising Derris extract and rubber distillate as described above was also applied at a dilution of 1:800.

Test organism: Black bean aphid (*Aphis rumicis*).

Host: Golden gleam nasturtium.

| Material emulsified | Total organisms | No. dead 24 hr. | Per cent dead |
|---|---|---|---|
| Rubber distillate | 834 | 456 | 54.7 |
| Rubber distillate plus Derris extract | 1,261 | 1,177 | 92.5 |
| Control (no treatment) | 1,216 | 36 | 2.9 |

Where the plant toxicant is slow acting as in the case of Derris resinate, it may be advantageous to incorporate pyrethrum or other fast-working natural or synthetic insecticides into the Derris resinate-rubber distillate combination in order to speed up the insecticidal action.

In those cases where the toxicant is unstable when exposed to light and air, stabilizers, inhibitors, or antioxidants known in this art may be added to reduce or inhibit such deterioration.

The composition of matter comprising rotenone or other plant toxicants and rubber oil distillates may be used in aqueous media or dissolved in petroleum oils, vegetable oils, or synthetic oils. The composition may be used in the form of a spray, or as a dust prepared in known manner by absorbing the liquid on a suitable powdered carrier such as talc, diatomaceous earth, walnut shell flour, and the like. It may also be used in conjunction or in admixture with other fugicides, insecticides, as well as insect repellants, ovicides, scalecides, mothproofing agents, emulsifying agents, wetting agents, spreading agents, sticking agents, penetrating agents, etc.

The compositions disclosed herein may be used as agricultural insecticides, animal dips, live stock sprays, household insecticides, mothproofing agents, etc.

Having thus described my invention, what I claim and desire to protect by Letters Patent is:

1. A method which comprises extracting organic plant toxicants from plants selected from the group consisting of Derris, cube, timbo, devil's shoe string, pyrethrum flowers and tobacco by means of a composite oil produced by destructive distillation of rubber, whereby to produce an insecticide.

2. An insecticide preparation containing an organic plant toxicant selected from the group consisting of rotenone, nicotine, nicotine sulfate, and extracts of Derris, cube, timbo, devil's shoe string, pyrethrum flowers and tobacco in solution in a composite oil produced by destructive distillation of rubber.

3. An insecticide preparation containing an organic plant toxicant selected from the group consisting of rotenone, nicotine, nicotine sulfate, and extracts of Derris, cube, timbo, devil's shoe string, pyrethrum flowers and tobacco in solution in a composite oil produced by destructive distillation of vulcanized rubber.

4. An insecticide preparation containing an organic plant toxicant selected from the group consisting of rotenone, nicotine, nicotine sulfate, and extracts of Derris, cube, timbo, devil's shoe string, pyrethrum flowers and tobacco in solution in a composite oil produced by destructive distillation of vulcanized rubber scrap from bead wire, said oil having a boiling range up to about 300° C.

WILLIAM P. TER HORST.